US008875272B2

(12) United States Patent
Jansen et al.

(10) Patent No.: US 8,875,272 B2
(45) Date of Patent: Oct. 28, 2014

(54) FIREWALL FOR CONTROLLING CONNECTIONS BETWEEN A CLIENT MACHINE AND A NETWORK

(75) Inventors: Bernhard Jansen, Rueschlikon (CH); Axel Tanner, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 1867 days.

(21) Appl. No.: 12/121,689

(22) Filed: May 15, 2008

(65) Prior Publication Data
US 2008/0289028 A1    Nov. 20, 2008

(30) Foreign Application Priority Data

May 15, 2007    (EP) .................................... 07108205

(51) Int. Cl.
G06F 21/00    (2013.01)
G06F 21/30    (2013.01)
G06F 13/24    (2006.01)
H04L 29/06    (2006.01)

(52) U.S. Cl.
CPC .......... *H04L 63/0281* (2013.01); *G06F 21/305* (2013.01); *H04L 63/1441* (2013.01); *G06F 13/24* (2013.01)
USPC ............................................ 726/11; 713/152

(58) Field of Classification Search
CPC ........ G06F 13/24; G06F 21/205; H04L 63/21
USPC ................. 726/11–12, 21; 713/152
See application file for complete search history.

(56) References Cited

U.S. PATENT DOCUMENTS

| 5,680,461 | A  | * | 10/1997 | McManis ........................ 713/162 |
|-----------|----|---|---------|------------------------------------------|
| 7,137,016 | B2 | * | 11/2006 | Nalawadi et al. ............. 713/300 |
| 7,725,934 | B2 | * | 5/2010  | Kumar et al. .................... 726/22 |
| 7,739,724 | B2 | * | 6/2010  | Durham et al. .................... 726/3 |
| 7,882,542 | B2 | * | 2/2011  | Neystadt et al. ................. 726/11 |
| 2002/0069369 | A1 | * | 6/2002 | Tremain ......................... 713/201 |
| 2004/0111531 | A1 | * | 6/2004 | Staniford et al. ............. 709/246 |
| 2006/0070066 | A1 | * | 3/2006 | Grobman .......................... 718/1 |
| 2006/0090136 | A1 | * | 4/2006 | Miller et al. ................... 715/734 |
| 2006/0136720 | A1 | * | 6/2006 | Armstrong et al. ........... 713/164 |

OTHER PUBLICATIONS

Garfinkel et al., A virtual Machine Introspection Based Architecture for Intrusion Detection, Feb. 2003, Network and distributed system security symposium, pp. 1-16.*

* cited by examiner

*Primary Examiner* — Hadi Armouche
*Assistant Examiner* — Dao Ho
(74) *Attorney, Agent, or Firm* — Ido Tuchman; William J. Stock

(57) ABSTRACT

A firewall system adapted for location outside the client machine, preferably in the same data processing device as the client machine but outside a virtual machine containing the client machine. Control logic of the firewall system receives incoming and outgoing connections from the network and client machine respectively. In response to a connection request initiating a connection between respective endpoints in the network and client machine, the control logic performs a security assessment comprising obtaining from at least one of the network and client machine information indicative of the security state of the endpoint therein, and allows or inhibits the connection in dependence on the result of the security assessment. The security assessment may be performed in accordance with a security policy of the system, and different security assessments may be performed for different connection requests in accordance with the security policy.

18 Claims, 2 Drawing Sheets

FIREWALL FOR CONTROLLING CONNECTIONS BETWEEN A CLIENT MACHINE AND A NETWORK

CROSS-REFERENCE TO RELATED APPLICATIONS

This application claims priority under 35 U.S.C. §119 to European Patent Application No. 07/108205 filed May 15, 2007, the entire text of which is specifically incorporated by reference herein.

BACKGROUND OF THE INVENTION

The present invention generally relates to firewall systems for controlling connections between client machines and networks.

In recent years, computer-related malware has undergone very rapid development, becoming ever more sophisticated. Computer systems today are subject to numerous forms of attack, by viruses, worms, spyware, rats (remote access trojans), and so on. While attacks were mostly for fun or vandalism in the early days of computer malware, these days we increasingly see malware created by criminals for personal profit. One of the very critical problems is the increasing number of trojan programs, i.e. malicious programs installed on a computer without the knowledge of the user, which compromise the system and typically reach out to the Internet to report confidential information (such as bank account passwords) to the attacker, or to make the compromised system a part of a BotNet which can later be used for criminal purposes (such as spamming, DDOS (Distributed Denial of Service) attacks, etc.). Increasingly, such BotNets are becoming valuable in their own right as they can be 'rented' on the underground for malicious purposes. These trojan programs can be introduced in a variety of ways, e.g. via worms, emails or downloads. By way of illustration, a recent study of machines connected to the Internet found 20% to be infected by viruses or worms and up to 80% infected with spyware.

Malware of the type described above is often combined with pieces of software known as 'rootkits'. These rootkits operate by intercepting normal system operation in order to hide the existence of the associated malware from the user or even the system administrator. This is done in some cases by changing system binaries, but it can also be done in a more sophisticated manner in deeper levels of the system. In any case, common to the most dangerous types of malware is the fact that they reach out from the local machine, be it in the case of trojans back to the attacker via the Internet, or in the case of worms to further spread the worm.

Various schemes have been proposed which aim to provide some level of security against malicious attacks of the type described above. The Trusted Computing Group (https://www.trustedcomputinggroup.org/home) promotes open industry standards and specifications for hardware building blocks and software interfaces designed to enhance security against attacks. The heart of the Trusted Computing system is a dedicated integrated circuit known as a Trusted Platform Module (TPM). This provides secure storage for security-critical information as well as functionality for security-related operations such as attestation. The attestation process involves supplying cryptographic checksums (hash values), generated from measurements of hardware and software configurations in a system at boot-time and on subsequent configuration changes, to a remote verifier where they can be compared with known values for a trusted system to verify that system integrity is intact. In the typical attestation approach of the verifying server the client application is modified (e.g. the web browser or mail client) to accommodate the system. A radical approach to Internet security is proposed in "Architecting a Secure Internet", Saikat Guha et al, http://nutss.gforge.cis.cornell.edu/pub/sosp05wip-guha.pdf. This involves establishing connectivity through the Internet only when needed, i.e. the default being 'no connection', requiring changed infrastructure and protocols for the Internet as a whole. The Cisco Network Admission Control (NAC) system described in http://www.cisco.com/en/US/netsol/ns466/networking_solutions_package.html employs a local agent on the client machine which gets interrogated during the first connection phase by the NAC server for the security posture of the client. If this is deemed sufficient, the client will be allowed to connect to the local network. Checking is restricted to the initial network connection, or scheduled polling, and the decision of the NAC server is 'black-and-white', i.e. either connected or not connected. "SOCKS: A protocol for TCP proxy across firewalls", Ying-Da Lee, http://ftp.cerias.purdue.edu/pub/tools/dos/socks.cstc/socks4/SOCKS4.protocol describes a protocol relaying TCP (Transport Control Protocol) connections across a firewall.

Before connecting to the Internet, a connection is made to the SOCKS demon which allows use of a very simple form of checking the connecting machines using the Identd protocol which are supported by the endpoints. Use of this system necessitates modifications in the client, and the setup is dependent on the specific network protocol.

Aside from schemes like the above, the main measures employed today to counter malware attacks are local installation of scanning tools like antivirus and spyware tools and local installation of personal desktop firewalls. These have a number of drawbacks. For example, the mechanisms are static: firewalls, for example, rely on decisions of users to create static rules allowing certain executables to access certain network ports/destinations. They also demand user expertise: for previously unknown (i.e. non-preconfigured) connection requests from local software, the user of the machine is prompted to deny or allow the access request. Very often the user has insufficient expertise to make these decisions, leading to 'holes' in the firewall through inappropriate choices of the user. There is the additional difficulty of administration and maintenance: how to place the software on every desktop and how to keep it up-to-date with signatures for example. Further, operation is mostly based on signatures for known-bad software, so systems are not ready for day-zero exploits for which signatures are not yet available. In addition, the placement of these security mechanisms on the local machine allows malware, after a successful compromise, to disable the security mechanisms or hide from them. In this regard, "Flexible OS Support and Applications for Trusted Computing" Tal Garfinkel et al, http://www.stanford.edu/~talg/papers/HOTO03/trusted-hotos03.pdf describes the general idea of using a virtual machine as a secure vantage point for a simple, local firewall. Besides the advantage of better protection from local compromises of the main virtual machine of the client, this approach corresponds completely to a normal personal desktop firewall.

BRIEF SUMMARY OF THE INVENTION

In view of the foregoing, there is a desire for improved security mechanisms to alleviate some or all of the problems discussed above.

One aspect of the present invention provides a firewall system for controlling connections between a client machine and a network. The firewall system is adapted for location outside the client machine and comprises control logic adapted for: receiving incoming and outgoing connections from the network and client machine respectively; and in response to a connection request initiating a connection between respective endpoints in the network and client machine, performing a security assessment comprising obtaining from at least one of the network and client machine information indicative of the security state of the endpoint therein, and allowing or inhibiting the connection in dependence on the result of the security assessment.

In contrast to existing firewalls, embodiments of the present invention provide firewall systems which are both outside the client machine itself and which can effectively "reach out" to one or both of the network and client machine to obtain information on the security state of connection endpoints. This automatic security assessment allows the system to decide whether to allow or inhibit connections with the network independently of the user. The problems associated with relying on user involvement are therefore avoided. Moreover, since the firewall system can actively gather security information in response to a connection request, the problems associated with static firewall rule-sets are obviated, and the system can respond dynamically to new security threats. The firewall system, being outside the client machine, has the advantage of protection from compromise of the client while offering the possibility for centralized administration and maintenance. In addition, embodiments of the invention are independent of any specific networking assumptions and do not rely on modifications to the client machine itself. Firewall systems embodying the invention can thus replace the functionality of a personal desktop firewall by a comparable yet superior mechanism outside the machine itself offering improved functionality for protecting security during interactions with a network.

Location of the firewall system outside the client machine means that the system is independent of, i.e. not under control of, the client machine and thus is protected from malware which successfully compromises the client. This could be achieved by location of the firewall system in a separate physical machine to the client. However, preferred embodiments utilize virtual machine (VM) technology described further below. In particular, preferred firewall systems are adapted for location in the same physical machine as the client but outside of a virtual machine containing the client, preferably in a further virtual machine running alongside the client machine. This offers particular advantages for the security assessment as discussed further below.

The particular way in which the security assessment is performed, and the nature of the security assessment itself, can be highly flexible in embodiments of the invention. For example, security assessments could be performed for all or only some connection requests. In preferred embodiments, the control logic of the firewall system is adapted to perform the security assessment for at least selected connection requests in accordance with a security policy defined in memory of the system. For example, the control logic may be adapted, in response to every connection request, to check the requested connection against a predetermined list of allowable connections specified in the security policy, and to perform the security assessment if the requested connection is not on the list. Different security assessments may be performed for different connection requests in accordance with the security policy. Embodiments of the invention are thus highly flexible, allowing the particular nature of the security assessment to be tailored as desired for specific systems and/or different connections in a given system.

Examples of particular security assessments performed in preferred embodiments will be described below. In general, however, the requested connection will be allowed or inhibited by the firewall control logic in dependence on the result of the security assessment. The control logic may inhibit a connection simply by blocking the connection, or a connection may be inhibited in some other way. For example, the control logic might delay, limit or restrict the connection in some manner, or even redirect the connection to an alternative endpoint as discussed further below. In some cases, the security assessment performed by the control logic may involve allowing the connection, monitoring traffic on the connection and then allowing or inhibiting continuance of the connection in dependence on the result of the monitoring process.

A second aspect of the invention provides a computer program comprising program code means for causing a computer to implement a firewall system as described with reference to the first aspect of the invention. It will be understood that the term "computer" is used here in the most general sense and includes any device, component or system generally which has a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer system. The program code means of the computer program may comprise any expression, in any language, code or notation, of a set of instructions intended to cause a computer to implement the system in question, either directly or after either or both of (a) conversion to another language, code or notation, and (b) reproduction in a different material form.

A third aspect of the invention provides a data processing system comprising a client machine and a firewall system for controlling connections between the client machine and a network. The firewall system is located outside the client machine and comprises control logic adapted for: receiving incoming and outgoing connections from the network and client machine respectively; and in response to a connection request initiating a connection between respective endpoints in the network and client machine, performing a security assessment comprising obtaining from at least one of the network and client machine information indicative of the security state of the endpoint therein, and allowing or inhibiting the connection in dependence on the result of the security assessment. Embodiments of the data processing system may include plurality of client machines, the firewall system being located outside all client machines and adapted for controlling connections between each of the client machines and the network.

In general, where features are described herein with reference to an embodiment of one aspect of the invention, corresponding features may be provided in embodiments of another aspect of the invention.

BRIEF DESCRIPTION OF THE SEVERAL VIEWS OF THE DRAWINGS

Preferred embodiments of the invention will now be described, by way of example, with reference to the accompanying drawings in which.

DETAILED DESCRIPTION OF THE INVENTION

Figure 1:
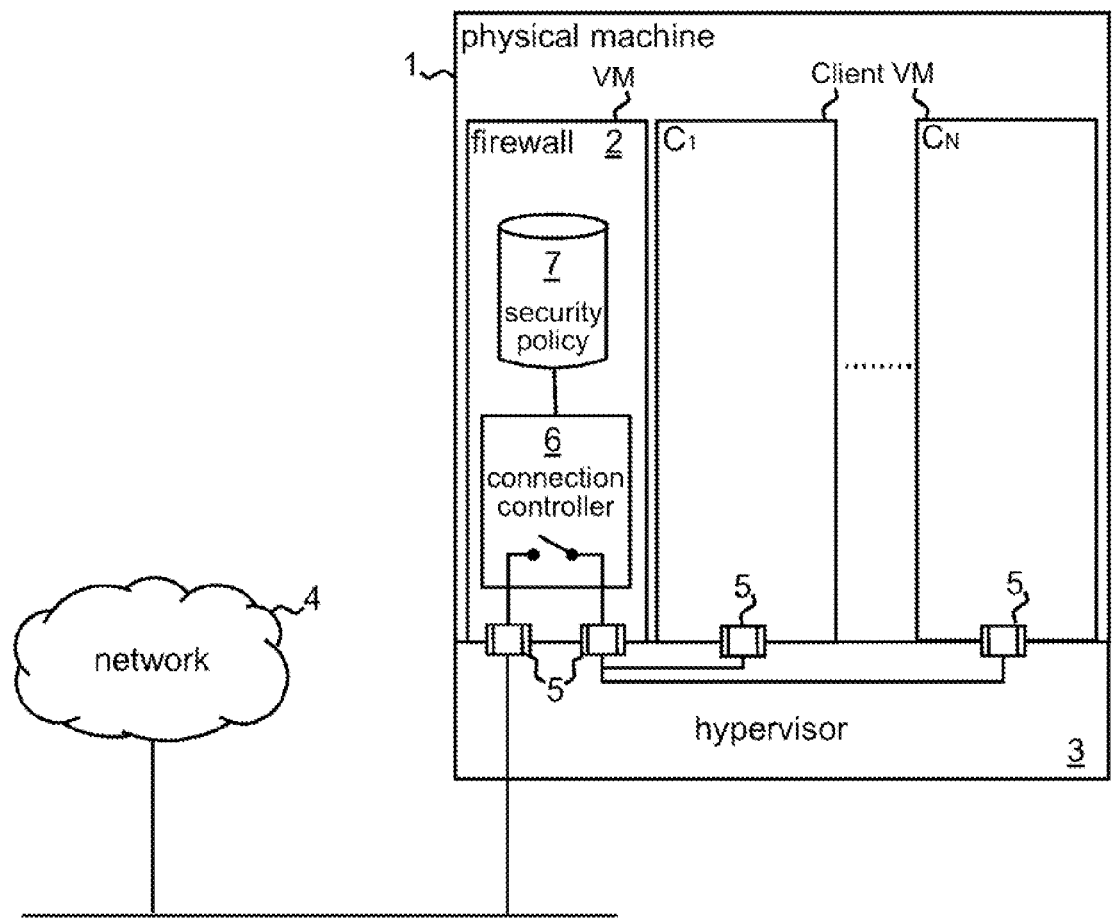
FIG. 1 is a schematic representation of a data processing system incorporating a firewall system embodying the invention.

FIG. 1 illustrates a data processing system 1 incorporating control logic implementing a firewall system 2 embodying the invention. In general the control logic of firewall 2 could be implemented in hardware, software or a combination thereof. In this specific embodiment, the data processing system 1 is assumed to be a general purpose computer that includes at least one processor. The firewall 2 is implemented in one of a number of virtual machines (VMs) within this computer. In particular, virtual machine monitor (VMM) technology is employed in known manner in computer 1 to partition the computer into a plurality of virtual machines under control of a virtual machine monitor implemented here by a virtual machine controller, or "hypervisor", 3. VMM technology is well known in the art and are not described in detail here. Briefly, however, the VMM implemented by hypervisor 3 here is a layer of software that runs directly on the hardware of a system. The VMM virtualizes all hardware resources, allowing the system to be logically partitioned into separate virtual machines. The VMM presents an abstraction of the hardware so that the presence of the VMM is transparent to the overlying VMs. Thus, through operation of the VMM, multiple virtual machines, each with their own operating system, can run independently of one another, multiplexing the underlying hardware resources of the same physical machine. The hypervisor 3 performs the usual functions of a virtual machine monitor and includes additional functionality allowing firewall 2 to control connectivity between computer 1 and a network 4 as described in detail below.

Suitable logic for implementing the functionality of firewall 2 and hypervisor 3 will be apparent to those skilled in the art from the description herein. Purely by way of example, an implementation of the system may be based on Linux and the open source hypervisor Xen (Xen Open Hypervisor, University of Cambridge (http://xen.sf.net)), with firewall functionality implemented using iptables, part of the Linux default installation (iptables, Linux implementation of network rules (http://www.netfilter.org/)).

Firewall 2 controls all connections between the network 4 and a plurality of client machines, each with their own set of application processes. Each of these client machines, indicated by C1 to CN in FIG. 1, is contained in a respective VM running on hypervisor 3. Hypervisor 3 routes all network connections to and from the client machines to firewall machine 2. This is enforced by the setup of (virtual) network cards 5 indicated in the figure. Only firewall 2 can connect to the real networking card and the physical network 4. Thus, the client machines are not allowed to connect or listen to the network 4 directly, but only through the firewall 2. If some process in a client machine initiates a connection to the network, the corresponding outgoing network packets will go to the firewall first. Similarly, packets destined for a client machine will go through the firewall 2. Control logic indicated as connection controller 6 in firewall 2 controls all connections between the network 4 and client machines in accordance with a security policy 7 stored in system memory allocated to the firewall VM. The operation of connection controller 6 is triggered dynamically in response to receipt of a connection request initiating a connection between network 4 and a client machine. This operation is described in the following with reference to FIG. 2.

Figure 2:
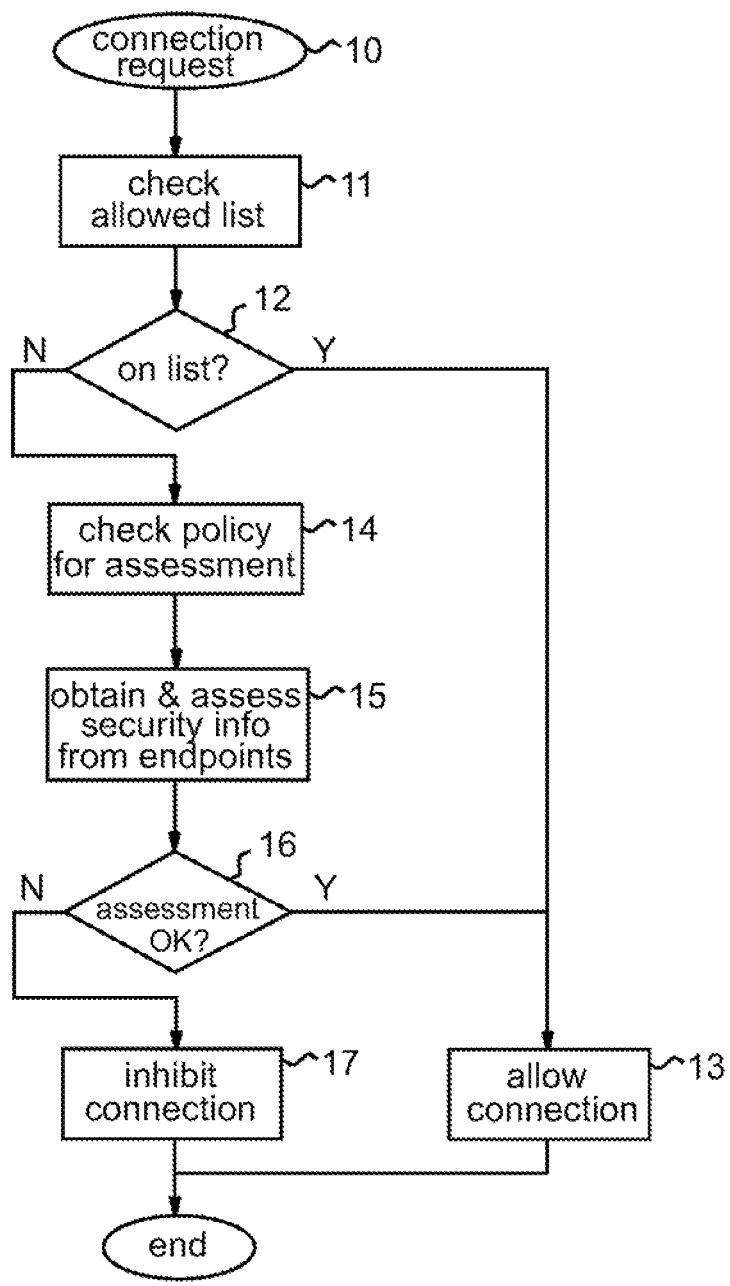
FIG. 2 is a flow chart illustrating operation of the firewall system of FIG. 1.

The flow chart of FIG. 2 illustrates the key steps in operation of connection controller 6 in response to receipt of an incoming connection request from the network or an outgoing connection request from a client machine. Receipt of the connection request is represented by step 10 in the figure. In this preferred embodiment, as indicated by step 11 in the figure, controller 6 first checks whether the requested connection is identified on a list of preconfigured, allowable connections maintained in the security policy 7 in system memory. If so, operation will proceed via decision step 12 directly to step 13 where the connection is allowed to proceed in the usual way. Thus, the connection request will be forwarded to the destination endpoint in the network or client machine as appropriate, and controller 6 will relay all packets on the subsequent connection as normal. Returning to step 12, if it is decided here that the requested connection is not on the "allowed list", then controller 6 will perform a security assessment to determine how to deal with the connection. In this preferred embodiment, different types of security assessment can be performed in accordance with the security policy 7. Thus in step 14 controller 6 accesses security policy 7 to determine the assessment to be performed for the connection in question. Next, in step 15 controller 6 obtains from one or both of the network and client machine (as specified by the security policy for the connection) information indicative of the security state of the corresponding connection endpoint(s) to enable the security assessment to be made. In step 16 controller 6 decides whether the assessment results are acceptable. If so, operation proceeds to step 13 and the connection is allowed to proceed as normal. If not, then in step 17 controller 6 implements whatever action is specified in the security policy to inhibit the connection in some manner. Particular examples of the assessment and the resulting actions which may be performed by controller 6 are described in detail below. Once the connection controller has allowed or inhibited the connection in step 13 or 17, the process is complete for the current connection request.

As mentioned above, in this embodiment it is assumed that multiple different types of security assessment can be performed by controller 6 according to what is specified in security policy 7 for different connections or types of connections. For example, different assessments could be indicated for connections involving specific endpoints or types of endpoints, e.g. particular client processes or particular network servers. Different security assessments could also be performed for example at different times to enforce varying levels of security as may be desired in a given system. Particular examples of security assessments which can be performed by controller 5 are described in the following.

For at least selected connections specified in security policy 7, controller 6 can conduct an attestation process for one or both of the connection endpoints. The attestation process here can be that specified by the TCG as discussed earlier. In this case, the controller obtains from the endpoint system(s) in question measurements of the system configuration, and compares these with known values, specified in policy 7 for example, to confirm that the endpoint system can be trusted. This attestation can be carried out for a remote network endpoint where the system in question so provides, and/or can be carried out for the endpoint in the local client machine. In the latter case, the necessary information is obtained via hypervisor 3. The configuration values obtained here could relate to the client machine as whole or could relate specifically to the particular client process involved in the connection.

The location of firewall 2 on the same physical machine as the clients offers particular advantages in this context via the privileged position of the hypervisor 3. Specifically, the arrangement allows for deep analysis of connecting processes whereby the in-memory state of an executable can be checked via the hypervisor. The in-memory state can therefore be used for local attestation purposes. In a more general attestation procedure for local processes which may be employed in some circumstances, the in-memory state can be compared to a list of known binaries and only allowed if recognized (so called whitelisting), or can be scanned for known-bad signatures (blacklisting). By allowing checking of the in-memory state, even though the attestation mechanism is outside the local client, the preferred arrangement enables changes of running binaries (e.g. by malicious use of buffer overflows) to be detected.

For other connections specified in security policy 7 in this example, the security assessment involves obtaining from the client machine some form of report information, indicative of running processes on the client machine, and comparing this with corresponding information obtained directly from memory of system 1 via hypervisor 3. This comparison can reveal whether an endpoint of the requested connection is hidden, in which case the connection can be inhibited. For example, the assessment process here may utilize a "lie detector" of the general type described in "A Virtual Machine Introspection Based Architecture for Intrusion Detection", Garfinkel et al, www.stanford.edu/-talg/papers/VMI/abstract.html. Assessments of this type can foil the malicious intent of rootkits to hide malware, since the fact that a process or a network listener is hidden inside a client operating system can be detected by comparing the information, e.g. of network listeners, inside of the operating system with the information derived from the outside through the hypervisor. Since there is no legitimate reason why this information should differ, any rootkit hiding specific pieces of malware will get highlighted very nicely, and connections to or from the malware can be inhibited. Such an assessment can be used not only when establishing connections from the client machine, but also on establishment of connections from the network connecting to a listening process on the client to check whether it is hiding. The firewall 2 could also watch periodically for new listening processes on the client. If the firewall detects a new listening process, it can use the lie-detector to assess whether the listener is hidden.

Other more general integrity verification processes can be performed for network endpoints in accordance with security policy 7, and in general the security state information for this purpose could be obtained from the network server in question or some other source in the network. For example, the controller may access a verification service on the network to validate certain information relating to the network endpoint, e.g. that the IP address is indeed the address of a genuine service provider.

The foregoing security checks allow protection against security problems originating on both sides of the firewall 2. For example, if a client machine is infected with a worm which is trying to spread via e-mail, when a connection to a mail server is requested the firewall will check the security status of the client machine, especially of the sending process. If this is a rogue process, the connection will be rejected, the process terminated and an alarm can be sent to the administrator. However, if the standard mail process is sending mail, the connection will be allowed. Conversely, if a mail server is compromised by a worm and tries to spread during connections with clients, when a connection to the mail server is requested the firewall can check the security status of the mail server via attestation. If the attestation fails, the connection is not established.

As indicated in the foregoing, the particular action taken by controller 6 in step 17 of FIG. 2 can vary for different connections in accordance with security policy 7. Thus, while simple blocking or refusal of the connection may be appropriate in some cases, in general connections might be inhibited by delaying, limiting or otherwise restricting the connection in some manner. In some cases, network traffic could be redirected to a honeypot system for analysis of suspicious behavior. The security policy may also ask the controller 6 to send appropriate alarms to a user or system administrator when necessary based on the result of a security assessment. For some connections specified in security policy 7 in this example, the controller 6 may allow the connection initially, then monitor traffic on the connection in some specified manner to decide whether to allow or inhibit continuance of the connection. For example, the controller may monitor traffic based on knowledge of bad general behavior and inhibit the connection if such behavior is detected. As a particular example, the monitoring process could take the rate of certain network events into account, e.g. to limit the rate of sending mail for a specific executable like a spambot program, or other DOS (Denial of Service) attacks. The controller could also perform enhanced logging of packets for closer scrutiny of particular connections, inhibiting the connection subsequently if suspicious behavior is detected.

It will be seen that the firewall system 2 provides for flexible and dynamic security checking of client and network endpoints during a network interaction, offering enhanced protection of both sides against malware of the type discussed earlier. The firewall system 2 can replace the functionality of a personal firewall, providing a comparable yet superior mechanism outside of the client machine itself, but still allowing the complete and automatic control of connections with the client. Compared to the static nature of existing firewalls, this represents a highly dynamic mechanism which allows transparent checks whenever needed.

Since the security checking is performed automatically, even if a known binary re-accesses a certain destination/port the status can be verified again for a new connection, enabling reassessing of the binary and security state of the machine. In addition, the user is not involved in configuration of the system which can be conveniently installed and maintained in a more centralized fashion. In particular, the security policy 7 is ideally a centrally administered and distributed policy. The system can easily incorporate knowledge of bad general behavior, e.g. hiding through rootkits, as discussed above in addition to standard signature-based security protection. The system does not rely on expertise of the user, but can automatically check security status and make a sound decision without user involvement. Moreover, since the firewall system 2 is outside the client machines, the system offers protection even against malware which successfully compromises a client.

Various changes can of course be made to the particular embodiment described above. For example, only one client VM may be present on some systems. Also, while a single security policy 7 is indicated in FIG. 1, in systems with multiple client VMs different security policies could be maintained for different client machines. Further, while particular examples have been given above, various other types of information in some way indicative of the security state of a connection endpoint may be utilized in security assessments performed in the system. In general, this information may relate to the security state of the network server or local machine as a whole or to the security state of a specific process or set of processes therein, e.g. the particular process making or receiving the connection. In addition, while the firewall system 2 is most conveniently located in its own VM, the firewall could theoretically be implemented as part of the hypervisor itself in some embodiments, though it is generally preferable to keep the hypervisor logic to a minimum for security reasons. Various other changes and modifications That which is claimed is:

1. A firewall system for controlling connections between a client virtual machine and a network, the firewall system being adapted for location outside the client virtual machine, but is within the same physical machine, the firewall system comprising:
   at least one computer processor; and
   a hypervisor to partition the at least one computer processor into separate virtual machines, one of the virtual machines including a client virtual machine; and
   wherein the at least one computer processor configured to:
      receive incoming and outgoing connections from the network and the client virtual machine respectively; and
      in response to a connection request, initiate a connection between respective endpoints in the network and client virtual machine, route the connection via the hypervisor to a firewall machine, perform a security assessment comprising obtaining from at least one of the network and client virtual machine information indicative of the security state of the endpoint therein, and allow or inhibit the connection in dependence on the result of the security assessment;
   for at least some connection requests, the security assessment performed by the processor includes allowing the connection, monitoring traffic on the connection and allowing or inhibiting continuance of the connection in dependence on the result of said monitoring.

2. A firewall system according to claim 1, the system being adapted for location in the same data processing device as the client virtual machine but outside a virtual machine of the data processing device which virtual machine contains the client virtual machine.

3. A firewall system according to claim 2, the system being adapted for location in a further virtual machine of the data processing device.

4. A firewall system according to claim 1, wherein the processor is further configured to perform the security assessment for at least selected connection requests in accordance with a security policy defined in memory of the system.

5. A firewall system according to claim 4 wherein the processor is further configured, in response to every connection request, to check the requested connection against a predetermined list of allowable connections specified in the security policy, and to perform the security assessment if the requested connection is not on the list.

6. A firewall system according to claim 4 wherein the processor is further configured to perform different security assessments for different connection requests in accordance with the security policy.

7. A firewall system according to claim 6 wherein, for at least some connection requests, the security assessment performed by the processor comprises obtaining from the client virtual machine information for attesting the security state of the endpoint therein.

8. A firewall system according to claim 6 wherein, for at least some connection requests, the security assessment performed by the processor comprises obtaining from the network information for attesting the security state of the endpoint therein.

9. A firewall system according to claim 6 wherein, for at least some connection requests, the security assessment performed by the processor comprises obtaining from both the network and client virtual machine information indicative of the security state of the respective endpoints therein.

10. A firewall system according to claim 6 wherein:
   the system is adapted for location in the same data processing device as the client virtual machine but outside a virtual machine of a data processing device which the virtual machine contains the client virtual machine; and
   for at least some connection requests, the security assessment performed by the processor comprises obtaining from the client virtual machine report information indicative of running processes on the client virtual machine, comparing the report information with corresponding information obtained, independently of the client virtual machine, from memory of the data processing device to determine if an endpoint of the requested connection is hidden, and if so inhibiting the connection.

11. A firewall system according to claim 1, wherein the security assessment is performed after initiating the connection.

12. A non-transitory computer-usable medium having embodied therein computer-readable program codes for causing a computer to implement a firewall system for controlling connections between a client virtual machine and a network, the firewall system being adapted for location outside the client virtual machine, but is within the same physical machine, the computer-readable program codes configured to:
   partition at least one processor by a hypervisor into separate virtual machines, one of the virtual machines including a client virtual machine;
   receive incoming and outgoing connections from the network and the client virtual machine respectively;
   in response to a connection request, initiate a connection between respective endpoints in the network and the client virtual machine, route the connection via the hypervisor to a firewall machine, perform a security assessment comprising obtaining from at least one of the network and client virtual machine information indicative of the security state of the endpoint therein, and allow or inhibit the connection in dependence on the result of the security assessment; and
   for at least some connection requests, performing the security assessment includes allowing the connection, monitoring traffic on the connection and allowing or inhibiting continuance of the connection in dependence on the result of said monitoring.

13. A non-transitory computer-usable medium according to claim 12, wherein the security assessment is performed after initiating the connection.

14. A data processing system comprising a client virtual machine and a firewall system for controlling connections between the client virtual machine and a network, wherein the firewall system is located outside the client virtual machine, but is within the same physical machine and comprises control logic adapted for:
   partitioning at least one processor by a hypervisor into separate virtual machines, one of the virtual machines including a client virtual machine;
   receiving incoming and outgoing connections from the network and the client virtual machine respectively;
   in response to a connection request initiating a connection between respective endpoints in the network and the client virtual machine, route the connection via the hypervisor to a firewall machine, performing a security assessment comprising obtaining from at least one of the network and client virtual machine information indicative of the security state of the endpoint therein, and allowing or inhibiting the connection in dependence on the result of the security assessment; and for at least some connection requests, performing the security assessment includes allowing the connection, monitoring traffic on the connection and allowing or inhibiting continuance of the connection in dependence on the result of said monitoring.

15. A data processing system according to claim 14 including a plurality of client virtual machines, wherein the firewall system is located outside all client virtual machines and is adapted for controlling connections between each client virtual machine and the network.

16. A data processing system according to claim 14 comprising a data processing device, wherein each client virtual machine is contained in a virtual machine of the data processing device and the firewall system is located in the data processing device outside the virtual machine.

17. A data processing system according to claim 16 wherein the firewall system is located in a further virtual machine of the data processing device.

18. A data processing system according to claim 14 wherein the security assessment is performed after initiating the connection.

* * * * *